US006476521B1

(12) United States Patent
Löf et al.

(10) Patent No.: US 6,476,521 B1
(45) Date of Patent: Nov. 5, 2002

(54) POWER OSCILLATION PROTECTION

(75) Inventors: Per-Anders Löf, Vällingby (SE); Daniel Karlsson, Malmö (SE)

(73) Assignee: ABB AB, Vasteras (SE)

( * ) Notice: Subject to any disclaimer, the term of this patent is extended or adjusted under 35 U.S.C. 154(b) by 8 days.

(21) Appl. No.: 09/653,265

(22) Filed: Aug. 31, 2000

(30) Foreign Application Priority Data

May 31, 2000 (SE) .............................................. 0002050
Jul. 31, 2000 (SE) .............................................. 0002801

(51) Int. Cl.$^7$ ................................................ H02J 1/02
(52) U.S. Cl. ...................................... 307/105; 307/102
(58) Field of Search ................................ 307/102, 105; 323/205, 207, 208

(56) References Cited

U.S. PATENT DOCUMENTS

| | | | | |
|---|---|---|---|---|
| 4,785,405 A | * | 11/1988 | Hasegawa et al. | 307/102 |
| 4,972,290 A | * | 11/1990 | Sun et al. | 361/64 |
| 5,227,713 A | * | 7/1993 | Bowler et al. | 307/102 |
| 5,625,277 A | * | 4/1997 | Khan et al. | 307/102 |
| 5,977,731 A | * | 11/1999 | Xia et al. | 318/147 |
| 6,313,752 B1 | * | 11/2001 | Corrigan et al. | 324/76.13 |

OTHER PUBLICATIONS

C. Counan et. al.: "Major Incidents on the French Electric System: Potentiality and Curative Measurement", IEEE Transactions on Power Systems, vol. 8, No. 3, Aug. 1993, pp. 879–886.
B. Ingelsson et. al.: "Special Protectoin Scheme against Voltage Collapse in the South Part of the Swedish Grid", CIGRE Paper 38–105, Paris, Aug. 1996. No page numbers.
B. Ingelsson et. al.: "Wide–Area Protection Against Voltage Collapse", IEEE Computer Applications in Power, vol. 10, No. 4, Oct. 1997, pp. 30–35.
O. Samuelsson: "Wide Area Measurements of Power System Dynamics–The North American WAMS Project and its Aplicability to the Nordic Countries" Elforsk Report 99:50, Technical University of Lund, Jan. 2000. p. 1–56.
I. Hiskens and M. Akke: "Analysis of the Nordel power grid disturbance of Jan. 1, 1997—using trajectory sensitivities", IEEE Transactions on Power Systems, vol. 14, No. 3, Aug. 1999, pp. 987–993.
A.G. Phadke. Synchronized Phasor Measurements in Power Systems , J IEEE Computer Applications in Power, vol. 6, No. 2, Apr. 1993, pp. 10–15.
L.H. Fink and K. Carlsen: "Operating under Stress and Strain", IEEE / 2 5 Spectrum, vol. 15, No. 3, Mar. 1978, pp. 48–53.
P. Kundur: "Power System Stability and Control", The EPRI Power System Engineering Series, McGraw–Hill, Inc., 1994, pp. 17–27, 128–136, 699, 766770, 817–822, 827–835, 1127–1131.

* cited by examiner

Primary Examiner—Brian Sircus
Assistant Examiner—Sharon Polk
(74) Attorney, Agent, or Firm—Dykema Gossett PLLC

(57) ABSTRACT

The present invention discloses a system protection scheme comprising of at least two system protection terminals (18), introduced at suitable locations in an electric power system (1). The system protection terminals (18) are interconnected by a communication system (22), preferably using a substantially dedicated communication resource. At least-two of the system protection terminals (18) are equipped to collect measurement signals (72) associated with time stamped voltage or current values of the power system at that particular location or quantities derivable therefrom. The measurements are evaluated and related data is spread to other system protection terminals (18). At least one of the system protection terminals (18) is equipped to evaluate the existence of poorly damped power oscillations in the power network and if necessary provide control signals (74) to power system actuating units. The evaluation is preferably based on changes in the node angle differences between the measurement locations.

41 Claims, 6 Drawing Sheets

POWER OSCILLATION PROTECTION

TECHNICAL FIELD

The present invention relates generally to devices, schemes and methods for network protection of electric power systems, and electric power systems comprising such devices and schemes. Network protection refers to measures in order to avoid or reduce a substantial disturbance in an electric power system. The invention relates in particular to such protection against poorly damped power oscillations in electric power systems.

BACKGROUND

Control and protections in electric power systems are of many different kinds. Single units are often provided with protection devices, which may detect any faults or if the unit is operated outside its limits. Such a protection device typically reduces the operation conditions or disconnects the unit, and is therefore only concerned about the local conditions.

In the present disclosure, "power system" and "power network" refers solely to electric power, even if not explicitly mentioned.

For system disturbances, where the whole or substantial parts of an electric power system are involved, system protection schemes are used, which detects the occurrence or an acute risk for occurrence of a major disturbance and provides measures to reduce the consequences. Such measures may e.g. be the disconnection of certain loads, the division of the power system network into smaller autonomously operating networks, etc. The situation, in which these system protection schemes are activated, are emergency or close to emergency situation, and the time for performing the necessary actions is very limited, typically in the order of a part of a second up to half a minute.

The present invention is aimed at indicating and protecting electric power systems against instability due to power system oscillations not sufficiently damped. An electric power system is in general terms considered stable if the oscillatory response of the power system during the transient period following a disturbance is damped and the system settles in a finite time to a new steady-state operating point. Power system stability depends on the existence of both the synchronizing and the damping torque. Lack of sufficient synchronizing torque results in instability through an aperiodic drift in rotor angle, while lack of sufficient damping torque results in oscillatory instability, i.e. oscillations of increasing amplitude. Rotor angle stability in electric power systems can be divided into transient (angle) and small-signal stability. Small-signal stability is the ability of an electric power system to maintain synchronism under small disturbances, where a disturbance is considered small if linearization of the system equations is permissible for the purpose of analysis. The present invention is concerned with damping of powers system oscillations by providing additional damping torque to maintain small-signal stability.

In many countries there is an on-going restructuring of the electric power industry. This restructuring includes deregulation, and in some cases privatization, of electric utilities. These changes in power markets around the world have led to substantially reduced investments in infrastructure, i.e. investments in hardware. A continuously increasing load level in combination with new power flow directions has led to that new operation conditions may appear for the system operators with respect to earlier operation conditions in well known electric power systems. New operation situations and fast production changes and power flow changes associated therewith increases the demands on the tools and facilities of the operator to have a continuous overview and control of the operation security and margins in the electric power system. The demands for models, measurement data and calculation programs will thereby increase.

One of the causes for the at present, in many places, increasing interest in stability issues is that a load growth without a corresponding increase in transmission capacity has resulted in that many power systems today are being operated closer to their limits. During the last decades, there has been an increase in generation capacity as well as in use of electricity in the industrial world. A problem is the power delivery infrastructure, which is becoming more stressed in the new high-traffic and more competitive electricity industry. The power grids have over the years also become more widely interconnected and cover larger geographical areas. The power grids built and extended during past decades were, in many cases, not planned for handling the large number of transactions taking place in today's deregulated power markets. As a consequence, power system damping has in some cases been reduced, which has led to an increased risk of poorly damped oscillations. As a result, there is likely a substantially increased risk for larger scale power system failures (black-outs).

The dependence in modern society on a reliable power supply must not be underestimated. Furthermore, more and more customers are today more and more sensitive to disturbances in the electric power systems. The increased focus on power quality (PQ) issues includes both unwanted variations in the power supply in form of e.g. voltage sags and dips as well as disruptions in the supply of power. For this reason, some of the existing defense plans have to evolve from systems designed in the 1960s or 1970s to meet the requirements of the actual power systems today. It is further not possible from a design viewpoint to build a power system that can withstand all contingencies that may occur.

In case of serious faults, combination of faults or extreme load or unexpected production changes in the power system, there are network protections at a number of locations over the world, which try to avoid extensive network breakdowns and instead limit the consequences and facilitate the recover of the network. The area of system protection schemes (SPS) comprises a number of different types of systems, where the information carrying signals may be control signals as well as information that certain measurement values have exceeded or fallen below their limits.

The defense plans of today against serious disturbances are mainly adapted for transient angle phenomena in the power network. These types of system protection schemes are mainly concerned with load disconnection or islanding of the network.

Small-signal stability can be enhanced by use of Power System Stabilizers (PSS), which is a device with a basic function of adding damping to the generator oscillations by modulation of the generator excitation control signal. Additional damping torque is achieved by modulating the generator excitation to develop a component of the electric torque in phase with rotor speed variations. The speed deviation is therefore a logical signal to use for controlling the excitation of the generator by using auxiliary stabilizing signals. However, in practice both the generator and the exciter exhibit frequency dependent gain and phase characteristics.

Conventional PSS devices are local, using exclusively local measurement for decisions on how to control generator excitation to damp power system oscillations. Commonly used input signals to a PSS for stabilization of poorly damped power oscillations via excitation control include speed deviation, frequency, electric power and accelerating power. These input signals are processed for to find indications of power system oscillations, which manifest themselves as variations in power, currents, voltages etc. The analysis is thus based on an indirectly obtained indication of power oscillations and therefore only gives an indirect picture for the rotor position of the generator. Additionally, supplemental stabilizing signals to enhance the damping of power system oscillations may be taken from modulation of generator input power control, control (switching) of active power loads, changes in power system operating conditions, control of SVC, HVDC converters and FACTS devices, etc.

The objectives of excitation control design is to maximize the damping of both local and inter-area modes of power system oscillations, without comprising the stability of other modes, as well as enhance power system transient stability. The measures to be taken to improve the power system small-signal (oscillatory) stability are typically designed for a specific mode of oscillations. Unusual and previously not studied operating conditions could lead to that fixed parameter settings for PSS provide insufficient additional damping torque, and could in (very) unfavorable situations even aggravate the oscillations. The possibility of distinguishing between different modes of oscillations and determine appropriate countermeasures based on local measurements, can be limited in prior art PSS devices in unusual and unfavorable network situations, e.g. where cascaded events progressively have weakened the electric power system.

A French system protection scheme is described in the article "Major Incidents on the French Electric System: Potentiality and Curative Measurement" by C. Counan et. al., IEEE Transactions on Power Systems, Vol. 8, No 3, August 1993, pp. 879–886. The system is built up in a hierarchic structure, where detection devices are scattered over the network according to a certain configuration. The detection devices are connected to a central analyzing unit, determining the risk for disturbances. The detection devices detect voltage beats by monitoring the variations of local voltage. In case of disturbances, the network is fragmented upon request of the central analyzing unit into isolated islands, having one or several detection devices. The scheme is mainly intended for transient angle disturbances. The measure to meet the disturbances, by load shedding or fragmenting of the power network is, however, quite crude and in most cases not the appropriate measure for handling oscillations, since the integrity of the power network is destroyed.

A network protection system in southern Sweden against voltage collapse has been designed jointly by Svenska Kraftnät, Vattenfall A B and Sydkraft A B and is described in "Special Protection Scheme against Voltage Collapse in the South Part of the Swedish Grid", by B. Ingelsson et. al., CIGRÉ Paper 38–105, Paris, August 1996 or "Wide-Area Protection Against Voltage Collapse" by B. Ingelsson et. al., IEEE Computer Applications in Power, Vol. 10, No 4, October 1997, pp. 30–35. The objective of the network protection system is to avoid a voltage collapse after a severe fault in a stressed operation situation. The system can be used to increase the power transfer limits from the northern part of Sweden or to increase the system security or a mixture of both. This system is, however, not suitable for detecting and counteracting power oscillations.

A general problem with existing system protection schemes is that the measured quantities often are insufficient to efficiently detect the power system oscillation disturbances or the mode of oscillation.

Equipment for measurement of complex ac quantities (amplitude and phase, phasor measurements) and systems for evaluating the risk for instability, based on local measurement quantities have recently been made available. Measurement and collection of time stamped complex quantities, phasor quantities, with respect to current and voltage can be performed by means of a Phasor Measurement Unit (PMU). These units comprise a very accurate time reference, achievable e.g. by using the Global Positioning Satellite (GPS) system. Such systems are installed e.g. in northwestern USA to record conditions of power systems and are used for a post-evaluation of an emergency situation. See e.g. "Wide Area Measurements of Power System Dynamics—The North American WAMS Project and its Applicability to the Nordic Countries" Elforsk Report 99:50, O. Samuelsson, Technical University of Lund, January 2000.

However, such data has not been considered to be involved in any system protection scheme used for detecting and counteracting power oscillations.

SUMMARY

An object of the present invention is thus to provide a system protection scheme for improved detection and damping of power system oscillations. A further object is to make use of the information contained in time stamped quantities and quantities derived therefrom as a base for protection decisions. Another object is to obtain information about the oscillatory relation between different positions in the power system. Another object of the present invention is to provide a system protection scheme, which has a fast response to indications of oscillatory disturbances. The response time should preferably be independent of external factors.

Schemes, devices, systems and methods according to the enclosed claims achieve the above objects. In general words, power system oscillations can according to the present invention be detected by evaluating the angle difference between phasor quantities measured at different, at least two, locations in the electric power network. The measurements of voltage, current or power could be taken from different areas in a power system or over a single line, cable or interconnection. Actions against detected power system oscillations are taken in at least one location.

Therefore, a number, at least two, of system protection terminals are introduced at suitable locations in the electric power system. The system protection terminals are interconnected by a communication system, using a substantially dedicated communication resource.

A number, at least two, of the system protection terminals are equipped to collect measurement signals associated with the characteristic of the power system at that particular location. The measurements comprise time stamped voltage and/or current values and/or complex ac quantities. The signals are processed and data related to the measurements are spread on the dedicated communication resource to the other system protection terminals. This processed data preferably comprises the rotor angle of generators in that particular location.

The system is equipped with evaluation means to evaluate the oscillatory condition of the power network and if necessary provide control signals to power system units to counteract poorly damped power oscillations. The evaluation is based on selected parts of the data available on the communication resource, locally available data and/or externally entered data. Preferably, the evaluation is based on differences in rotor angles between different locations in the power system.

A number of the system protection terminals are provided with control signal providing means, which provide power system units with suitable control signals for counteracting power oscillations found by the evaluation of measurements. Preferably, these system protection terminals also comprise the evaluation means.

Preferably, the system protection terminals have local means for storing data. The data comprises the near history of system information as well as older measurements. The storing means are used e.g. to provide (latest available) information about conditions in surrounding areas during autonomous operation conditions, i.e. in situations when the communication fails. The stored data is also preferably used to follow up stressed situations in a post-analysis, e.g. during restoration after a full or partial power system black-out. Preferably, the storing means are searchable databases.

The substantially dedicated communication resource connecting the system protection terminals is designed with a high capacity. For protection against damping of system wide power oscillations, the requirements on the communication time are of the order of fractions of a second.

For systems with a multitude of system protection terminals, each system protection terminal has preferably access to at least two links of the communication system, providing a first degree of redundancy concerning communication failures. Each system protection terminal comprises a processor and suitable means for the communication. Preferably, a local database is provided for each terminal.

By having access to time stamped information from more than one location within the power network, any changes in the rotor angle difference between these locations may easily be detected. Changes in rotor angle differences indicate directly power oscillations including the locations of the measurements. Furthermore, the frequency, damping and amplitude of the oscillation are easily monitored. The direct measurement of variations in node angles proposed in the present invention thus provides a better picture of the modes of power oscillations of interest, i.e. the synchronism between generators. Suitable counteracting measures may then be selected, i.e. an adaptive Power System Stabilizer (PSS) is accomplished.

The present invention also allows for adaptive settings of parameters of PSS and other equipment that could enhance damping of power system oscillations. In such cases parameters have to be set according to the mode of oscillation of interest, which requires an exchange of control information between the terminals, to enhance the overall power system stability.

Further advantages and examples are understood from the following detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Power system engineers often distinguish between on one hand unit or equipment protection and on the other hand system protection. One obvious requirement to enable a secure and reliable supply of electric power in a power network is to protect the individual components of a power system against damage, when a fault appears. This protection, normally referred to as equipment or unit protection, is typically designed to prevent the current resulting from a fault to cause thermal damage to components. Such component protection typically aims to disconnect the faulty transmission line or equipment. A huge number of various component protection equipment and methods exist today, but despite the importance of such devices, the scope of the present invention does not comprise such component protection schemes.

In addition to the component protections, there is also a need to protect the integrity of the overall power network. The term integrity is concerned with the quality or condition of "something" being whole or undivided. In this case it is related to that all, or at least the vital or substantial, parts of a power network are stable and in synchronous operation. This corresponds to the state of operation (described below) of the power system being either normal or alert.

Figure 6:
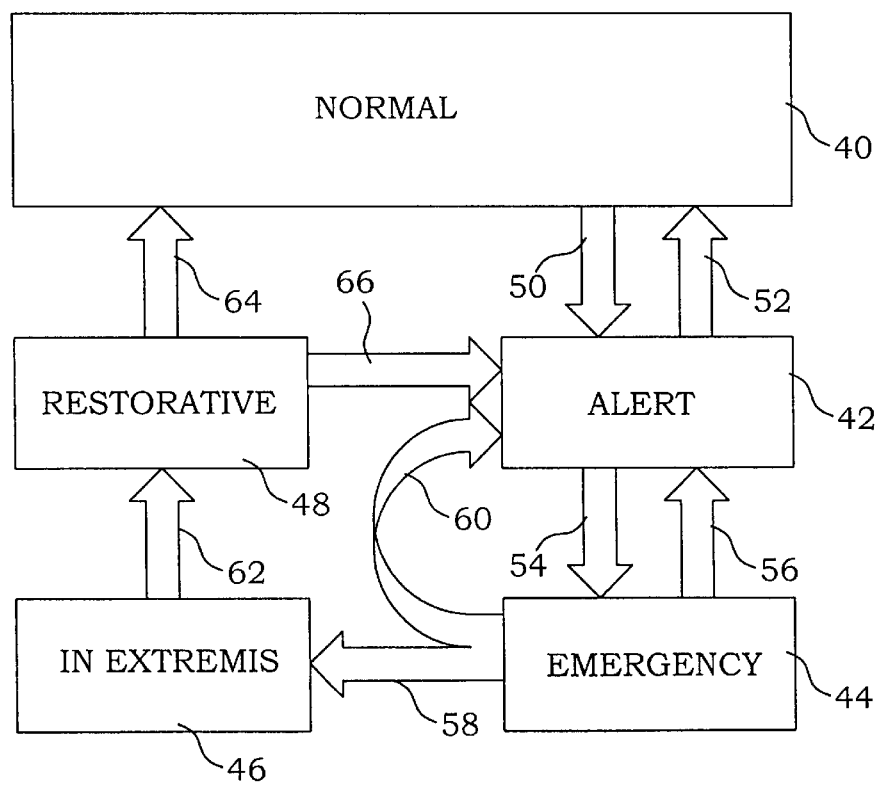
FIG. 6 is an illustration of the different states of operation of an electric power system.

The states of operation are discussed in connection with FIG. 6, where five states of operation are illustrated. (See also Appendix 1 in the co-pending Swedish patent application No. 0002050-3) In a normal operating state 40, the power generation is adequate to supply the existing load demand. No equipment is presently overloaded. All constraints on the power system are satisfied. In this normal operating state 40, normal reserve margins are present, which margins are sufficient to provide a certain level of security. These margins are normally designed with respect to the stresses to which the system may be subjected, both regarding generation and transmission. A power system is in the normal operating state 40 during the vast majority of the time. Any deviation from this state is an exception, however, a serious one.

If conditions nevertheless are changed 50 in such a manner that the provided security level may be too small, or the probability of disturbances may have increased, the system is in an alert state 42. In this alert state 42, all constraints of the system would still be satisfied in an isolated view, i.e. no objects are operated outside its margins. However, the whole system is less secure than in the normal operating state 40. The available margins to cope with disturbances may easily be exceeded even by rather simple and common faults, which then could result in violation of some system constraints. Equipment would be more or less severely overloaded, compared with its rated capabilities. In the alert state 42, preventive actions 52 can be taken to restore the system back into the normal operating state 40. The term protecting the integrity of an overall power system can, as discussed earlier in this context, be related to securing the operation of the power system in the normal and, for shorter terms also, in the alert states of operation.

If such preventive actions 52 do not take place before another sufficiently severe disturbance, the system is transferred 54 into an emergency state 44. Here, system constraints are violated as a result of the additional disturbance and the security of the system is breached since there does not exist any security level any more. The system is, however, still intact during this emergency state 44, i.e. the actual electrical connections of the system do still exist, and emergency control actions or "heroic measures" could therefore be initiated in order to restore 56 the system to at least the alert state 42. However, the system is unstable and will within a certain time disintegrate. If a system starts to disintegrate, certain parts will go into the "in extremis" state 46 while other parts may "self-heal" and form functionally operationally islands. Emergency control action should be directed towards sparing as many pieces of the system as possible and avoid a total collapse. Once a system has entered the emergency state, the deliberate control decisions and actions that are appropriate to the normal 40 and even the alert state 42 are no longer adequate. More immediate action is called for.

If the emergency control actions are too slow or inefficient, the disturbance overstresses the system. The system starts to disintegrate 58 into an "in extremis" state 46. In this state system constraints are no longer valid and major portions of the system would not be intact any more and most of the system load would be lost. If the collapse is halted 62 before all parts of the system are lost, some remaining equipment will operate within rated capability and the system will enter into a restorative state 48. Here, control actions are taken to pick up lost load and reconnect the system, even if the entire system may not be restored immediately. From this state, the system could transit 66 to the alert state 42 or go back 64 the entire way to the normal operating state 40. The actual path depends on the circumstances of the emergency situation.

The present invention mainly comes into operation in the emergency state 44. The aim of the SPS is to sense and identify situations, which normally leads to the "in extremis" state 46, take actions and bring the system back to the alert state 42. The SPS will, by its actions, guide the unstable power system of the emergency state into a, at least fairly, stable alert state. This means that even if the power system violates its constraints during certain moments, the continuous operation will eventually lead back to a state where the constraints again are fulfilled. The arrow 60 in FIG. 6 thus illustrates the action of SPS. If the encountered disturbance is very severe, the transition between states of operation may take place without passing through the 'intermediate' stages in FIG. 6. Examples are transition directly from the normal state 40 to the emergency state 44 if the encountered disturbance is more severe than the faults described in the design criteria for the power system, and also transition directly from the alert state 42 to the "in extremis" state 46 in case of a very severe disturbance. Irrespectively of the precise path taken during the transition between states of operation, the general aim and purpose of an SPS is the same.

The objective of the proposed System Protection Scheme (SPS) is consequently to avoid (serious) network disturbances caused by poorly damped power oscillations. The protection is performed by stopping or limiting the breakdown of the system, i.e. the transition into the "in extremis" state 46 by use of so called "emergency control actions". Today, local damping measures is the main emergency control mechanism, when power oscillations are concerned. Performed emergency control actions are aimed at moving the state of operation from the entered emergency state 44 back into the alert state 42, and by that means avoiding transition into "in extremis" state 46, and associated power system black-outs.

The proposed System Protection Scheme focuses on system protection against harmful power oscillations. Emergency protection devices/schemes are dealing with incidents with a relatively low probability and enormous consequences. The risk, defined as the product of probability and consequence, for such events is therefore hard to derive. But due to the ever-increasing dependency of modern society of a reliable power supply, the proposed System Protection Scheme will serve a very important role. Strategies for reducing the risk and effects of major disturbances in the power system are a major concern for power utilities—both regarding planning and operational aspects.

A more 'stringent', mathematically based, definition for the above presented states of operation is given in Appendix 1 of the co-pending Swedish patent application No. 0002050-3, from which the present application claims priority.

The state of operation (discussed above) can in simplified terms be said to correspond to that the power flow (algebraic) equations are fulfilled, and there is no immediate risk of loss of synchronism in the electric power system. The aim is to prevent widespread interruptions or large area black-outs. Secure and reliable electric supply is of crucial importance and in the light of the general technical development, the demands on the safety of the power system delivery will continue to increase. Considerable efforts are made to maintain the supply of electric power, not only during normal operating conditions, but also at abnormal operating conditions. A System Protection Scheme (SPS) is the common name used when the focus for the protection is the integrity of an overall power network.

SPS is designed to detect abnormal system conditions and take predetermined, emergency action to preserve system integrity and provide acceptable system performance. The action is therefore only exceptionally a pure isolation of faulted elements, since such actions normally are provided by local equipment protections. SPS action, in general, instead includes load shedding and changes in system configuration. SPS action, for damping of power oscillations, may comprise actions like additional signals to the voltage regulator (exciter) and/or governor control of generators, regulations in load or control signals to SVC, HVDC-converters and/or FACTS devices. The object of these changes is to damp power oscillations in order to maintain power system stability.

Power system stability can in a broadly defined context be described as the property of a power system to remain in a state of operating equilibrium under normal operating conditions and to be able to regain an acceptable state of equilibrium after being subject to a disturbance. More details on definitions of power system stability can e.g. be found in P. Kundur: "Power System Stability and Control", The EPRI Power System Engineering Series, McGraw-Hill, Inc., 1994, pp. 17–27, 699, 817–822. Stability is a condition of equilibrium between opposing forces. The mechanism by which interconnected synchronous machines maintain synchronism with one another is through restoring forces, which act whenever there are forces tending to accelerate or decelerate one or more generators with respect to other generators in the system. Under steady-state conditions, there is equilibrium between the input mechanical torque and the output electrical torque of each generator, and their rotor speeds remain constant.

If the system is perturbed this equilibrium is upset, resulting in acceleration or deceleration of the rotors of the electrical machines according to the laws of motion of a rotating body. Small disturbances are continually occurring in a power system through e.g. load variations. An electric power system is in general terms considered (small-signal) stable if the oscillatory response of the power system during the transient period following a disturbance is damped and the system settles in a finite time to a new steady-state operating point. Stability problems are traditionally related to synchronous operation, since power systems (almost completely) rely on synchronous machines for generation of electric power. Other types of istability problems in power systems include voltage and frequency instability. The ability of all synchronous generators to remain in synchronous operation is influenced by the dynamics of generator rotor angles and power-angle relationships.

Rotor angle stability is another term for the ability of interconnected power systems to remain in synchronous operation, and can further (as described in the introduction) be subdivided into small-signal and transient stability. The present invention is concerned with small-signal (oscillatory) stability, which involves study of electromechanical oscillations inherent in power systems. Not sufficiently damped power system oscillations, i.e. not effectively damped oscillations, can lead to fatigue in machine shafts, excessive wear of mechanical actuators, reduced stability margins e.g. due to limitations in power transfer over tie-lines and cause problems with co-ordination of control systems, and, if another triggering event occurs such as a disturbance, instability may occur.

Power system small-signal oscillatory stability depends on the existence of both synchronizing and damping torque. Lack of sufficient synchronizing torque results in instability through an aperiodic drift in rotor angle, while lack of sufficient damping torque results in oscillatory instability. The variation of the power output from a synchronous machine as the rotor angle oscillates is a very important factor for determining stability properties of these machines with respect to synchronous operation.

Problems related to small-signal instability as a result of insufficient damping of power oscillations can be divided into local modes, inter-area modes, control modes and torsional modes. Local modes are associated with the swinging of units at a generation station with respect to the rest of the power system. Most commonly encountered small-signal stability problems of local plant mode oscillations have frequencies in the range of 0.7 to 2.0 Hz. Inter-area modes are associated with the swinging of many machines in one part of the power system against machines in other parts of the system and have widespread effects. They are commonly caused by two or more groups of closely (electrically) coupled machines being interconnected by weak tie-lines. Large interconnected systems usually have two distinct forms of inter-area oscillations: one with a very low frequency mode involving all generators in the system, where the frequency of mode of oscillation is in the order of 0.1 to 0.3 Hz, and higher frequency modes involving subgroups of generators swinging against each other where the frequency of mode of oscillation is in the order of 0.4 to 0.7 Hz. Two other modes of oscillations are control modes associated with e.g. generator unit controls and torsional modes associated with the rotational components of the turbine-generator shaft system.

The aim of the present invention is to provide power oscillation protection; in particular against poorly damped low frequency modes of oscillations, i.e. local or inter-area modes of oscillation. This is accomplished by direct measurements of variations in node angles, to detect frequencies of power system oscillation relevant for the problem of interest. For the above defined modes of interest, the frequencies of interest are typically in the range of 0.1 to 2.0 Hz. To allow for detection also of unusual power system configurations, load variations and widely varying operating conditions, it is of interest to cover a spectrum of oscillations that is slightly broader than this typical range. A preferred embodiment of the present invention thus detects power system oscillations between 0.05 and 4.0 Hz. In an effort to study small-signal stability problems originating from lack of sufficient damping torque, the measured input signal is filtered, e.g. to avoid interaction with torsional modes.

Low frequency power system oscillations are today commonly controlled by Power System Stabilizers (PSS), providing damping by modulation of the excitation control of generators. The PSS is designed to provide additional damping to the rotor (angle) oscillations by controlling its excitation using auxiliary stabilizing control signals. The automatic voltage regulator (AVR) normally controls the settings of the exciter. It is of importance that settings of control and protection equipment of generators are co-ordinated. Each power system stabilizer should be carefully designed and installed since it is supposed to provide damping of inter-area oscillations under widely different operating conditions. This is a very difficult task, among other things since the detection is made on local criteria, and there are examples of situations when PSS has not managed to damp power system oscillations. An example of such a case will be provided below.

The trend of today, to merge protection and control functions together in more and more integrated substation units, has-to be considered when defining SPS. A scheme that controls the operation of objects in the power system as a preventive measure to cope with general or local abnormal operation conditions is basically an SPS. The major issue that distinguishes SPS from protection systems of power system elements or objects is how users conceive SPS. The implementation of SPS is not yet standardized with regular ('off the shelf') products in prior art. An SPS for power oscillation protection, like all protection systems have to meet high requirements on reliability, which below will be exemplified with how the Nordic power system design criteria allows for use of SPS as an alternative to investments in hardware as power system reinforcements to handle the applicable planning criteria.

An electric power system is normally built to handle a pre-defined set of contingencies, i.e. the applicable network planning (or design) criteria, which conventionally is based on a set of dimensioning faults, without instability problems.

If some fault or combination of faults assigned by the planning criteria could not be fulfilled, it normally meant that the primary power system had to be reinforced. Such reinforcements could include building or upgrading of transmission lines. Investments in primary components for an electric power system are normally very expensive and alternative methods should be sought for whenever possible. If SPS, in the present invention in the form of power oscillation protection, are allowed to be used for fulfillment of applicable planning criteria, they must have high reliability. The requirements on high reliability can be divided into demands for high dependability and high security. It is of great importance that a failure to operate or an unwanted operation does not make the situation worse.

The primary purpose of an SPS is to detect power system operating situations where there exists a risk for serious network disturbances and take suitable counteractions to reduce the risk of serious network disturbances, potentially leading to large scale power system black-outs. Counter-measures can include switching of shunt capacitors/reactors, start of gas turbines, request for emergency power from neighboring areas, disconnection of low priority load and, finally, (non-discriminative) load shedding. For use in system planning, according to the network planning criteria applicable to the Nordic power system, the same reliability is required from a network protection scheme as that of the primary protection.

A general power network has different states of operation, depending on the actual situation concerning faults, disturbances, load and generation requests, etc. The basics of defining System Operating States can be found in "Operating under Stress and Strain" by L. H. Fink and K. Carlsen, IEEE Spectrum, Vol. 15, No 3, March 1978, pp. 48–53. The general basic ideas are briefly discussed above and below in connection with the intended area of use of the present invention.

The operation of power systems can be characterized by three objectives: quality, security and economy. The overall operational objective for power systems is to find a satisfactory compromise between the two conflicting objectives of security and economy. Economic considerations are in many power systems today, partly due to the on-going deregulation of power markets, the major influencing factor of these two objectives.

Based on the presentation of states of operation discussed above, it follows that the intentional automatic control action that can be taken to save the power system or restore sufficient reserve margins, can be divided into preventive and emergency actions. During normal operation, the focus is on economic aspects of power system operation, and economic operation is hence playing the more important role. While during more stressed network operational conditions, such as in an alert state, and in particular during emergency situations, the focus for control objectives shifts towards security. The ultimate objective here is keeping as much as possible of the network intact and generators connected to the grid. The breakdown normally results in one or several more severe problems in the power system. The main concern in the emergency state is of course system security. System Protection Schemes form in this respect a last line of defense in case of severe disturbances. The aim of actions taken by SPS is to provide uninterrupted power supply by use of sometimes rather ruthless methods, i.e. by taking actions that could be referred to as measures of last resort (and which would not be used during normal operational conditions). The objective of SPS is to retain power system operational security.

In prior art PSS devices, local measurements are used to estimate or detect power oscillations of each specific mode. These estimations or detections are based mainly on variations of shaft speed (deviations), terminal frequency, electric power and accelerating power of the machine. Power oscillations do give rise to variations in these quantities, but also other phenomena may influence them. The detection of relevant power system oscillations is hence a very complex problem, in particular if only local measurements are used in the process. Fixed settings for PSS may under widely varying operating conditions not always provide the desired damping, and in certain (unusual) cases even aggravate the problem. Detection of the mode of oscillation of interest and the process of deciding suitable counter-measurements for a specific case is hence not a trivial question, at least not when only having access to local measurements.

A more accurate indication on power oscillations is instead available from the node angle difference between different locations in the network. The angle difference is a measure of the power transmitted between the two locations. Changes, and in particular poorly damped oscillations in the angle difference, are therefore indicative of power oscillations present in the system.

A more detailed description of the connection between node angle positions and power system oscillations based on the swing equation and the equal-area criterion, and their importance for small-signal stability, is discussed below.

Power system oscillations correspond to oscillations of the rotor angle (position) of synchronous machines. The below introduction to properties of rotor angle stability is based on P. Kundur a "Power System Stability and Control", The EPRI Power System Engineering Series, McGraw-Hill, Inc., 1994, pp. 17–27, 128–136, 827–835. The behavior of the rotor angle, $\delta$, is determined by the swing equation (sometimes also referred to as the equation of motion). The swing equation is an equation for the rotational inertia of generators, describing the effects of unbalances between the electromagnetic and mechanical torques for synchronous machines. The swing equation can be written as $$\frac{2H}{\omega_0} \frac{d^2\delta}{dt^2} = P_m - P_{e,\max} \sin\delta$$

where $P_m$ is mechanical input (in p.u.; per unit)

$P_{e,max}$ is maximum electrical output (in p.u.)

H is inertia constant for generator (in MWs/MVA)

$\delta$ is rotor angle (in electrical radians)

t is time (in seconds)

Figure 11:
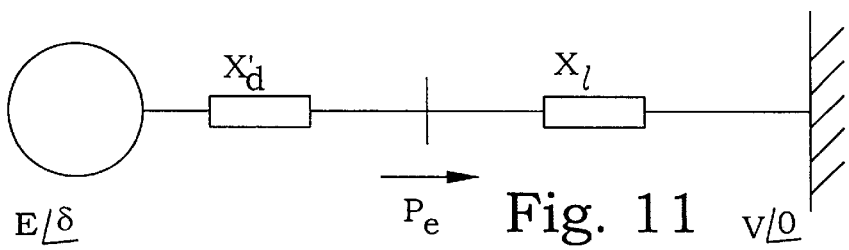
FIG. 11 is an equivalent circuit for the single-machine infinite bus model of a power system.

Fundamental aspects of power system oscillations will be addressed. The studied power system model consists of a synchronous generator delivering power to a large system through a transmission line. An equivalent circuit of this single-machine infinite bus power system model is given in FIG. 11. All resistances in the system are neglected. An infinite bus represents the external (large) power system. The transmission line is represented by a single reactance ($X_l$), which could also include the reactance of a step-up transformer connected to the generator. The synchronous generator is represented by the classical model, which in principle is a simple voltage source of fixed magnitude behind a reactance. Effects of the speed governor are hence neglected.

The voltage behind the transient reactance (X'd) of the synchronous generator is below denoted E. The voltage E of the generator leads the voltage of the infinite bus, V, with the angle δ, i.e. the rotor angle of the synchronous generator. With the chosen models, the magnitude of the internal voltage of the generator, E, remains constant if the system is perturbed, while the rotor angle, δ, changes since the rotor speed of the generator deviates from the synchronous speed, $\omega_0$. The electrical power output from the above power system model can be written as:

$$P_e = \frac{EV}{X_T}\sin\delta = P_{e,\max}\sin\delta$$

where the reactance $X_T$ is the sum of the reactances of the transient reactance of the generator and the reactance of the transmission line, i.e.

$$X_T = X'_d + X_l$$

and the maximum electrical output is $$P_{e,\max} = \frac{EV}{X_T}$$

During a disturbance the rotor angle, δ, will vary according to the above equations. The oscillations of the rotor angle during a disturbance are superimposed over the synchronous speed, $\omega_0$. The speed deviations, $$\Delta\omega_r = \frac{d\delta}{dt},$$

is much smaller than the synchronous speed, $\omega_0$. Therefore, the speed of the synchronous generator, $\omega_r$, is so close to the synchronous speed that it for practical purposed can be considered to be $\omega_0$. Further, the air-gap torque may, in the per unit system, be considered equal to the air-gap power, in the per unit system. The torque and the power output from the generator can hence (in the p.u. system) be considered as interchangeable when studying the swing equation.

Power system oscillations will below be studied in an example where the mechanical power input to the synchronous generator will be changed in a step. If the disturbance is small enough to allow linearization of the system equations, this allows for study of small-signal stability in the above model of a synchronous generator connected to an infinite bus.

Figure 1:
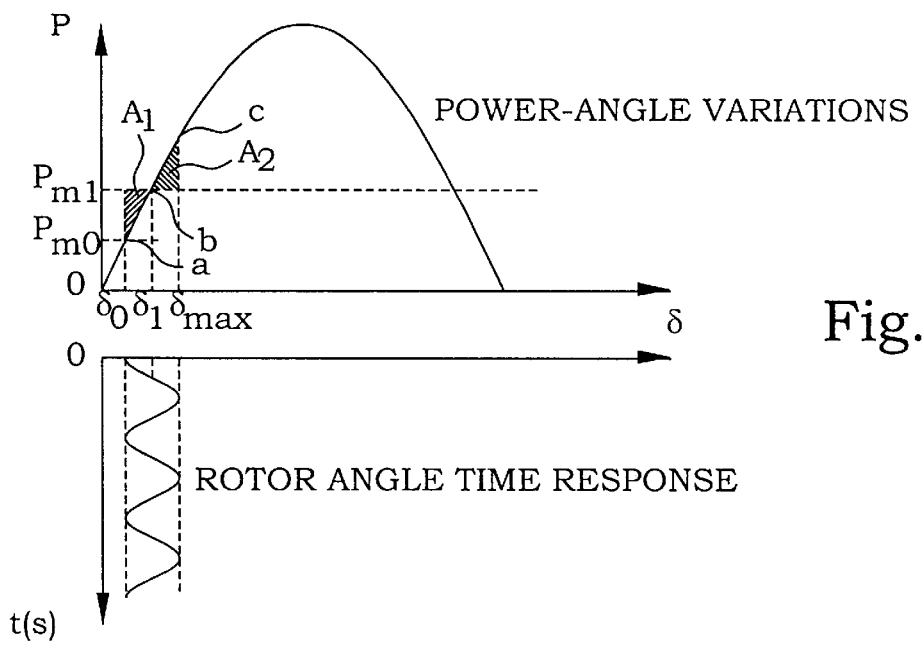
FIG. 1 is a diagram illustrating the relation between rotor angle variations and power oscillations.

A sudden increase in the mechanical power input from an initial value, $P_{m0}$, to a new level, $P_{m1}$, as shown in FIG. 1. Because of the inertia of the rotor of the synchronous generator, the rotor angle cannot change instantly from the initial value, $\delta_0$, to the new equilibrium point for the rotor angle, $\delta_1$. The initial equilibrium point in FIG. 1 is denoted a and corresponds to the initial rotor angle and initial mechanical input power, while the new equilibrium point after the disturbance is denoted b. At the new equilibrium point, b, in FIG. 1 the mechanical power is in excess of the electrical power and the resulting accelerating torque causes the rotor to accelerate from the initial operating point towards the new operating point following the power-angle curve in FIG. 1. The rate of change for the rotor angle during this transition is determined by the swing equation.

The difference between $P_{m1}$ and $P_e$ represents the accelerating power at any instant during the transition between points a and b. The accelerating power is consequently zero when point b is reached, but since the rotor speed is higher than the synchronous speed the rotor angle of the synchronous machine continues to increase. For rotor angles larger than $\delta_1$, the electrical power is greater than the mechanical power and the rotor decelerates. At some value, here denoted $\delta_{\max}$ since it is the peak value of δ, the rotor speed is again equal to the synchronous speed. This occurs at point c in FIG. 1, where the electrical power is higher than the mechanical power and hence the rotor continues to decelerate while the speed, $\omega_r$, drops below the synchronous speed, $\omega_0$. This results in that the rotor angle follows the power-angle curve from point c over b to the original point a, where the rotor speed again has recovered to the synchronous speed. At point a, the mechanical power is again larger than the electrical power and the oscillations continues indefinitely.

The result for the chosen power system model of the disturbance, a sudden increase in the mechanical power input, became continuous oscillations of the rotor angle, δ, around a new equilibrium value, $\delta_1$. The rotor angle response in form of rotor angle oscillations with constant amplitude (undamped oscillations) is shown by the plot of the rotor angle versus time in the lower part of FIG. 1. The time response of the rotor angle with the above power system model resulted in oscillations continuing unabated following the initial disturbance. In practice, there are for most cases many sources of damping ignored in the simple modeling used. Sources of positive damping could come from resistances, which were neglected in the above used simplified model, field flux variations and rotor damper windings, neglected by representing the synchronous generator with the classical model.

The maximum angle excursion, $\delta_{\max}$, for a step change in the mechanical power input could either be obtained graphically from the power-angle curves (shown in FIG. 1) or from solving the swing equation. Based on the chosen power system model, the solution states if the rotor angle increases indefinitely (unstable case) or oscillates around a new equilibrium point (stable case).

The relationship between the rotor angle and the accelerating power can according to the above given swing equation be written $$\frac{d^2\delta}{dt^2} = \frac{\omega_0}{2H}(P_m - P_e)$$

By multiplying both sides by 2 dδ/dt, the above relation can be rewritten $$\frac{d}{dt}\left(\frac{d\delta}{dt}\right)^2 = \frac{\omega_0(P_m - P_e)}{H}\frac{d\delta}{dt}$$

which if integrated becomes $$\left(\frac{d\delta}{dt}\right)^2 = \int \frac{\omega_0(P_m - P_e)}{H}d\delta$$

Initially, the speed deviation, dδ/dt, is zero, but will change due to the disturbance. To have stable operational conditions, the rotor angle, δ, must be bounded and hence have a maximum value, $\delta_{\max}$. This condition is satisfied if the accelerating area, Al, is equal or less than the available decelerating area, $A_2$, in FIG. 1. The kinetic energy, E, gained during the acceleration between points a and b, corresponding to the area $A_1$ in FIG. 1, can be written $$E_1 = \int_{\delta_0}^{\delta_1} (P_m - P_e) d\delta$$

While the kinetic energy lost during the deceleration between points b and c, corresponding to the area $A_2$ in FIG. 1, can be written $$E_2 = \int_{\delta_1}^{\delta_{max}} (P_e - P_m) d\delta$$

Since the power system model used is free of loss, the energy gained is equal to the energy lost and area $A_1$ is equal to area $A_2$ if the system is to be stable. If on the other hand, the area $A_1$ is greater than $A_2$, stability will be lost through an aperiodic drift in the rotor angle. This corresponds to lack of synchronizing torque.

The above used power system model, with a classical generator model and no resistances, results in an undamped model. If positive damping is added, the above indefinitely oscillations of the rotor angle of the synchronous generator becomes damped. This corresponds to a stable case, where the damping torque over time reduces the rotor angle oscillations until they settle down at a new equilibrium point on the power-angle curve. If the damping torque is negative or considered insufficient to damp rotor oscillations, small-signal stability of the power system can be improved by providing additional damping.

The use of direct measurement of the variations in node angles for power oscillation protection proposed in the present invention provides a better picture of the modes of power oscillations of interest, i.e. the synchronism between generators. The state equation for a non-linear system, such as used for stability studies of power systems, is a linearized model consistent of first-order differential equations with constant coefficients. The eigenvalues of the state equation matrix are the roots of the characteristic equation corresponding to the state equations. Each eigenvalue, $\lambda_i$, i.e. root of the characteristic equation, defines an exponential time function, $\exp(\lambda_{it})$, which satisfies the state equation. In power system analysis, the exponential time function, $\exp(\lambda_{it})$, which satisfies the state equations with zero input disturbance, is called a mode of oscillation (or simply mode) of the system. Any constant multiplier of a mode of oscillation is also a mode. For a power system with n generators, there will be (n−i) electromechanical modes of oscillation. If all eigenvalues have a negative real part, the power system is stable, while if at least one eigenvalue has a positive real part, the corresponding mode grows exponentially with time and the system is unstable. The right eigenvector, corresponding to a specific eigenvalue, describes how each mode of the system is distributed throughout the state vector, i.e. the mode shape. The corresponding left eigenvector, together with the initial conditions of the system state vector, determines the magnitude of the mode in question.

Electromechanical power system oscillations are related to the dynamics of rotors of generators, often resulting from the interchange of power between generators in one part of the system against generators in another part of the system across a weak interface. The response of the power system is influenced by all modes of oscillations, i.e. determined by the eigenvalues and corresponding right and left eigenvectors of the characteristic equations. The frequency of the oscillations depends on the inertia of the generating units involved, strength of the system and operating conditions. Modal analysis techniques are most useful in the study and analysis of inter-area oscillations, where they can determine the frequency and the damping of the oscillation as well as the pattern of generator involvement in the oscillation. The entries of the mode shape determined by components of the right eigenvector, which is a complex vector if the corresponding eigenvalue is complex, define both the relative amplitude and phase of oscillations. The modes of oscillation are functions of the physical properties of the power system, such as generator inertia, generator controls and line impedances. In studies of multi-machine systems, the mode shapes indicate how machines oscillate against each other. Modal analysis provides valuable information concerning understanding the nature of power system oscillations and selecting counter-measures, including finding suitable controls, location and modulating signals.

Direct measurements of the node angle difference between at least two points in a power system open up for adaptive damping control by providing an improved picture of the rotor angle oscillations compared with indirect local measurements. An adaptive setting of devices for power system damping control provides an opportunity to adjust the setting with respect to the present network configuration and operating conditions. Improved possibilities of handling difficult damping problems could hence be achieved by use of a network defense scheme based on SPS terminals providing direct measurements of the node angle difference and sending control signals, including parameter settings, to e.g. PSS units at generators. The present invention of system protection schemes for damping of power oscillations hence allows for and provides opportunities for the development of new adaptive control strategies, based on the introduced direct measurements of node angle differences, to provide additional damping torque to damp the generator rotor oscillations.

Figure 2:
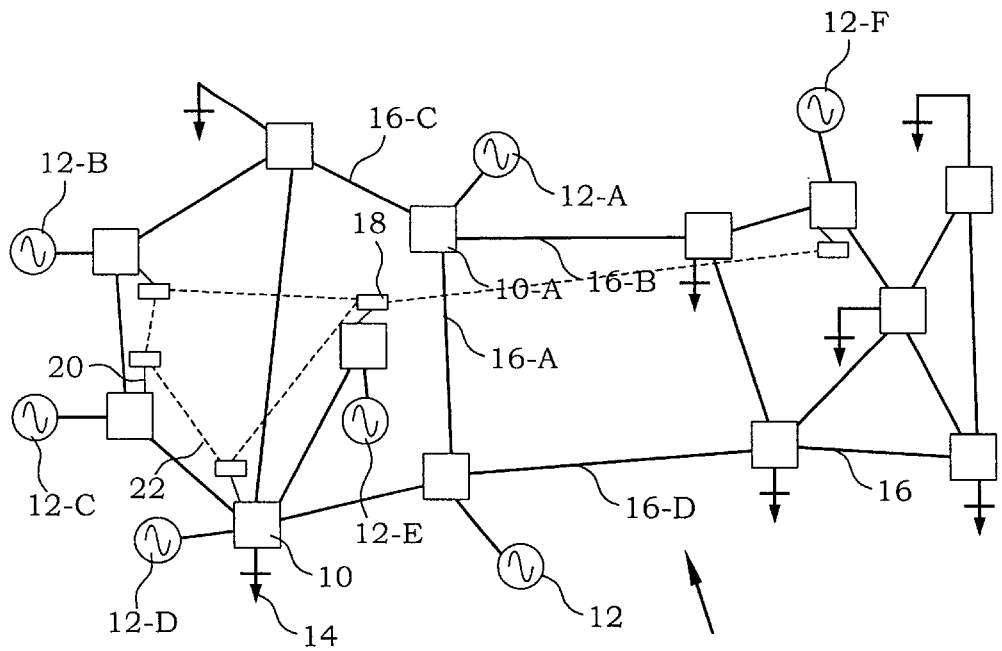
FIG. 2 is an exemplifying illustration of a power network with a system protection scheme according to an embodiment of the present invention.

To explain the benefits of the present invention, a couple of examples will be discussed. FIG. 2 illustrates an electric power system network with a system protection scheme according to the present invention. The power network comprises a number of nodes connected by power lines 16. (Only one of each item is provided with a reference number, unless specifically referred to.) The nodes could be connected to generators 12 and/or loads 14. System protection terminals 18 are provided at selected nodes, connected by measurement obtaining connections 20 to the nodes. A communication network 22, having at least one substantially dedicated communication resource connects the system protection terminals to each other. In this example, the nodes connected to the generators 12-B to 12-F are provided with system protection terminals 18.

The illustrated electric power system 1 has in its left part high capacity generators 12 and in its right part a high proportion of the loads 14. The general transmission situation is therefore normally that the left part generates power, which is transmitted to the loads in the right part. Two main power lines connect the right and left parts of the power system.

Figure 3:
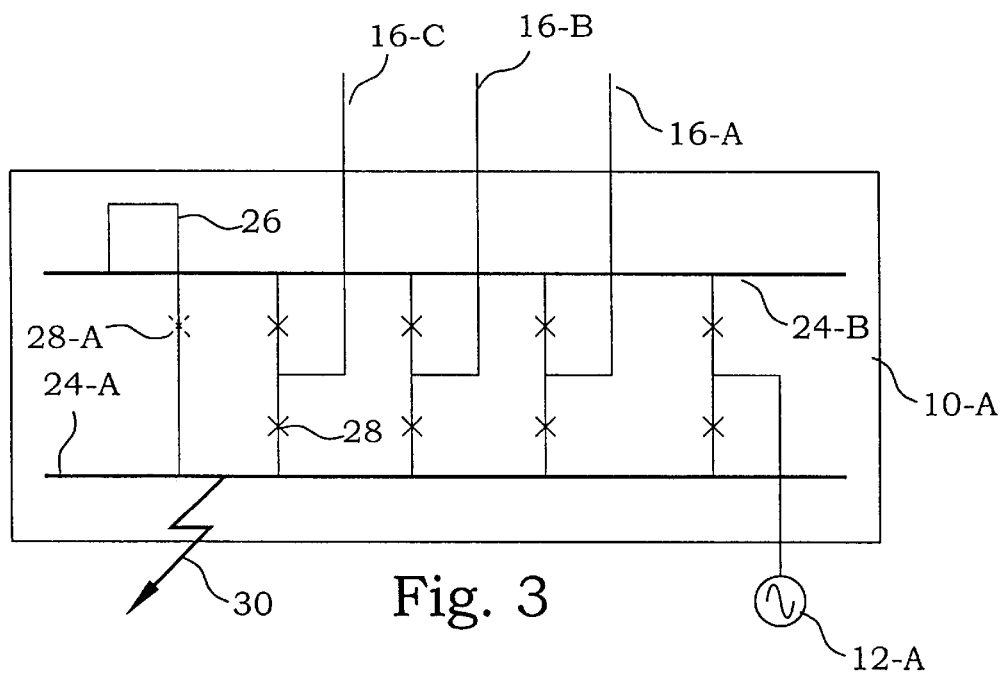
FIG. 3 is an illustration of a defective bus bar fault in the power system of FIG. 2.

The node 10-A in FIG. 2 is illustrated in more detail in FIG. 3. The node is an interlocking installation and bus bars 24-A, 24-B are here used for connecting the different objects 12-A and power lines 16-A, 16-B and 16-C. The power lines and objects are connected to the respective bus bars 24-A, 24-B via circuit breakers 28. A circuit breaker 28-A is also provided at the interconnection 26 between the bus bars 24-A, 24-B.

Assume a bus bar fault. The circuit breaker 28-A has become inoperable, e.g. as a result of corrosion. During normal operation, the power system will not notice this circuit breaker deficiency, and the operation continues according to normal routines. Now, assume that the lower bus bar 24-A suddenly becomes connected to ground, as illustrated by the arrow 30. The lower bus has to be disconnected immediately, which is taken care of by the typical action of object protection arrangements. Such an arrangement will open the lower circuit breakers 28 in order to separate the power lines 16-A, 16-B and 16-C and the generator 12-A from the faulted lower bus bar 24-A. Also the circuit breaker 28-A of the interconnection is ordered to open. However, due to the corrosion, this circuit breaker 28-A cannot be opened, why also the upper bus bar 24-B becomes connected to ground. The connections 16-A, 16-B and 16-C and the line to the generator 12-A have to be cut off, e.g. by operation of the upper circuit breakers.

Now, returning to FIG. 2, the power system 1 has lost the generator 12-A and the power lines 16-A, 16-B and 16-C. The generated power may perhaps be compensated for by other generators in the power system, but all power now has to be transmitted by the single power line 16-D. The power system is subject to another disturbance. Due to the long transmission lines and the asymmetric load and power generation, power oscillations are induced in the electric power system 1. These oscillations are in this example assumed not to be efficiently damped, and continue for a relative long period of time. The power system is therefore in an unstable state and will eventually break down if no emergency actions are taken.

The system protection terminals 18 according to the present invention will now come into action and save the integrity of the power network. In this example, each system protection terminal comprises a phasor measurement unit (PMU), characterizing the dynamical evolution of the state in respective node. These complex ac quantities are communicated in the communication network 22 in order to spread the information within the system protection arrangement. The system protection terminals 18 connected to generator 12-E and 12-F are in this example also provided with control signal providing means, which in turn comprises evaluation means for detecting power oscillations. This evaluation means detects the undamped power oscillation as a changing rotor angle difference between different nodes. Control signals are sent to the respective nodes, in order to instruct a regulation of the generated power in opposite phase as the detected power oscillation. Due to the intercommunication the regulation may take place at one, several or all of the generators 12-B to 12-F. The regulation of generators 12-B to 12-E is performed by the control signal providing means of the system protection terminal 18 connected to generator 12-E. The control signal means of the system protection terminals may provide suitable control signals to any standard Power System Stabilizers (PSS) of the generators, which PSS are performing the actual damping. Examples of damping measures are discussed more in detail below. Especially for the single unit in the right system it might be necessary to use more powerful damping means, such as governor boosting or braking resistors to achieve satisfactory damping of the oscillations.

Figure 4:
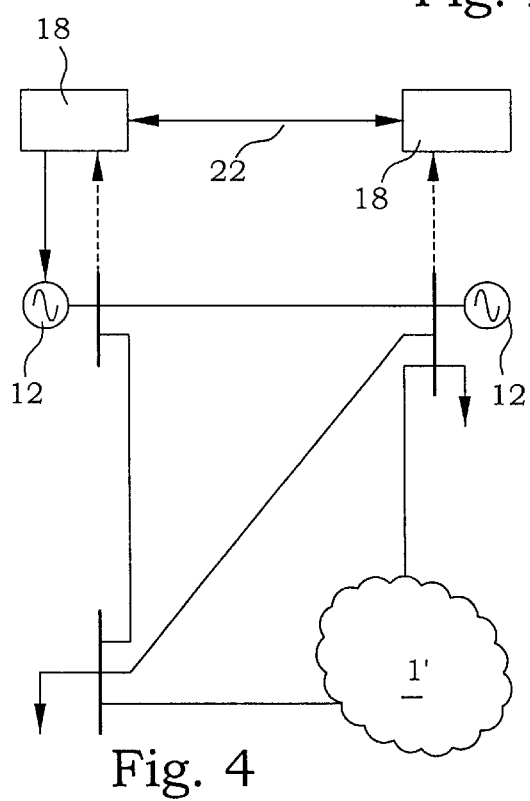
FIG. 4 is another exemplifying illustration of a power network with a system protection scheme according to the present invention.

Another embodiment of an SPS for damping of power oscillations is presented in FIG. 4. This SPS consists of two power system angle transducers (PMUs) for wide-area PSS application. The SPS measures the node angle at both locations. Reference numeral 1' refers to the not explicitly shown parts of the power system. Any action to provide additional damping is, however, taken at only one of the two locations. This is the simplest example of a wide-area PSS based on direct measurements of node angles. The angle difference between the two locations is derived from PMU measurements made at a rather high frequency, e.g. 10–30 Hz, in order to be able to detect oscillation frequencies of interest. The derivation of the angle difference is made at the location for the action. Parameters of interest to estimate include amplitude, damping and frequency for the relevant modes of detected power system oscillations.

A power system angle transducer (PMU) is placed at the first location, where only measurements are made. The second location where both measurements are made and control actions are taken requires a PMU as well as control algorithms and necessary actuator capability to implement the control action to provide the desired additional damping. The communication link between the two locations is a high-speed communication link, in this embodiment a dedicated communication channel in a fiber optic connection. This simple example with two SPS terminals applies to a remote generator (or a group of generators) connected to a (relatively) strong external power system via a transmission corridor, on a tie-line between two systems, or between two parts of a meshed system.

By the direct access to the angle difference between two critical points in the power system, the control algorithm can be based on a more direct picture of the rotor voltage vector positions of generators than can be achieved by local measurements based on e.g. power transfer. Of course, also other types measurements can be sent from the remote terminal to the point of decision for counter-measurements, such as voltage magnitudes and circuit breaker positions. Based on the direct measurement of the angle difference between the two nodes, a suitable control law provides an input signal to a PSS, which provides additional stabilization via excitation control by influencing an AVR (automatic voltage regulator) of the generator. The necessary added damping torque is in this embodiment applied as a braking torque, proportional to the deviation in rotor speed, added to the PSS.

Figure 10:
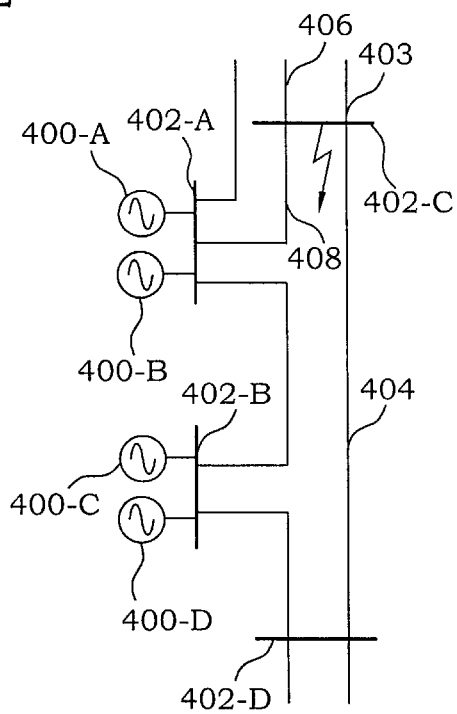
FIG. 10 is a schematic illustration to an example of an existing power network where a system protection scheme according to the present invention would be beneficial.

A severe disturbance occurred at Ringhals power station in south-western part of Sweden during the night of Jan. 1, 1997. The disturbance is described in "Analysis of the Nordel power grid disturbance of Jan. 1, 1997—using trajectory sensitivities", by Ian Hiskens and Magnus Akke, IEEE Transactions on Power Systems, Vol. 14, No 3, August 1999, pp. 987–994. Ringhals power station consists, as indicated in the principal figure of the network configuration shown in FIG. 10, of four nuclear power units, each with an active power generation of between 860 and 960 MW. The generators 400-A to 400-D are connected two and two to two separate busbars 402-A and 402-B, respectively. The system was heavily loaded before the initial disturbance, although the loading condition was unusual with export from Denmark, through Sweden, to Norway.

The initial fault was an earth fault on a 400 kV busbar 402-C at a substation in the region. The protection of busbar 402-C operated correctly and tripped all lines 403, 404, 406, 408 connected to this substation. The fault tripped one of the heavily loaded lines 404 transferring power from Denmark to Norway. The result of this was changes in the power flow and increased loading on the remaining lines. Approximately four seconds after the initial fault, another transmission line was tripped (not shown). The two northern generator units 400-A, 400-B were now only weakly connected to the rest of the power grid by relatively long radial transmission lines through the busbar 402-A. The power output from these two generators 400-A, 400-B was at this stage oscillating with growing amplitude. Despite the action of existing PSS equipment according to prior art, the two units were disconnected approximately 10 seconds after the initial fault. Approximately seconds after the two generators 400-A and 400-B at Ringhals had been disconnected, the power oscillations were damped out and the frequency had recovered to a steady-state value.

Conventional PSS units were in this case, with a severe disturbance and an unusual loading situation, obviously not sufficient to damp the power system oscillations that occurred when another transmission line was disconnected four seconds after the initial fault. The arisen network situation with a sudden change in impedance between the generator and the strong external network, can be considered to be rather typical of incidents with cascading events progressively weakening the power system. The applied PSS damping actions were designed for a significantly different topology of the network than was present during this fault course. Even if the actions would have been powerful enough to save the situation, they were applied in the wrong manner.

Angular measurements according to the present invention, i.e. from a number of locations in the system, could easily have identified the mode of power system oscillation of interest. A system protection scheme for damping of power system oscillations according to the present invention could then have adjusted parameters and sent relevant control signals to one or more PSS units to provide appropriate additional damping of the mode of oscillation of current interest. The damping based on identified oscillation modes may therefore be an action adapted to the present situation. Such an SPS with adaptive setting of existing PSS controllers could have saved the system from disconnecting the two large generators at Ringhals nuclear power station during the above discussed emergency situation.

Figure 5:
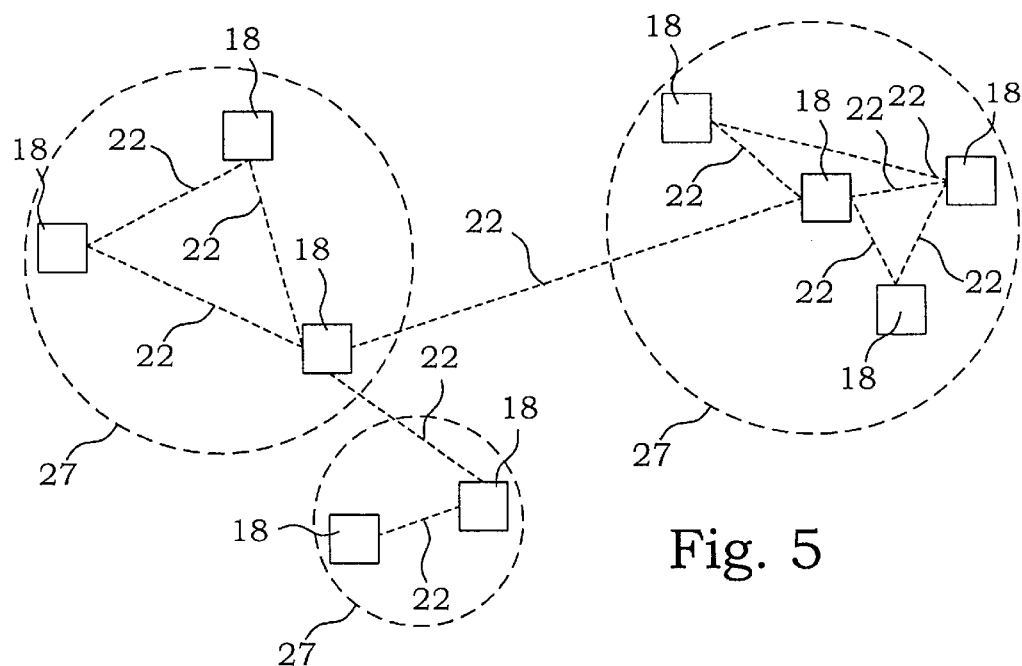
FIG. 5 is an illustration of a combination of system protection schemes.

The three examples above comprise system protection terminals in different configurations. In order to provide for a better total protection, different system protection terminal configurations may be combined to one network. In FIG. 5, a number of system protection arrangements are illustrated. Three SPS arrangements 27 are present, encircled by broken lines. A common communication network 22 connects all of the system protection terminals.

In one embodiment, each of the arrangements above are provided as more or less separate arrangements, in that the communication of the measured characteristics of the power system are communicated in one resource each, over the common communication system. In another embodiment, the communication resources are of such capability that the data of all arrangements are possible to distribute within a certain satisfactory predetermined time. In such a case, the system protection terminals select which data is of interest for its own purposes. The system protection scheme can therefore be built in a very modular manner, allowing for future adaptations to new operation conditions or to new network characterizing equipment installed. System conditions, which are not influenced by the changes, may also be unchanged in the system protection scheme, and only the relevant parts have to be updated.

Furthermore, by letting the local units make the necessary decisions, the process requirements for each protection mode are reduced, since only relevant data are retrieved from the communication system and processed. Also, since the decisions are made closer to the actual place of the emergency action, the requirements on control signaling facilities are reduced. An advantage is also that several decision processes may be active in parallel, and there is no need for prioritizing different decision processes.

The communication system is one important component in the present invention. It is preferred to provide a communication system which is as safe and reliable as possible. One way to provide ti reliability is to provide redundancy in the communication system. In systems of many system protection terminals, it is thus a desire to provide at least three of the system protection terminals with at least two communication links each. In such a way, a broken communication link may be compensated by sending the data via another path in the communication system. If all terminals are arranged in a ring structure, one broken communication link can be handled. However, a second fault will split the communication system in two parts. The more communication links available and the more meshed they are, the more alternative communication paths are present.

Figure 7:
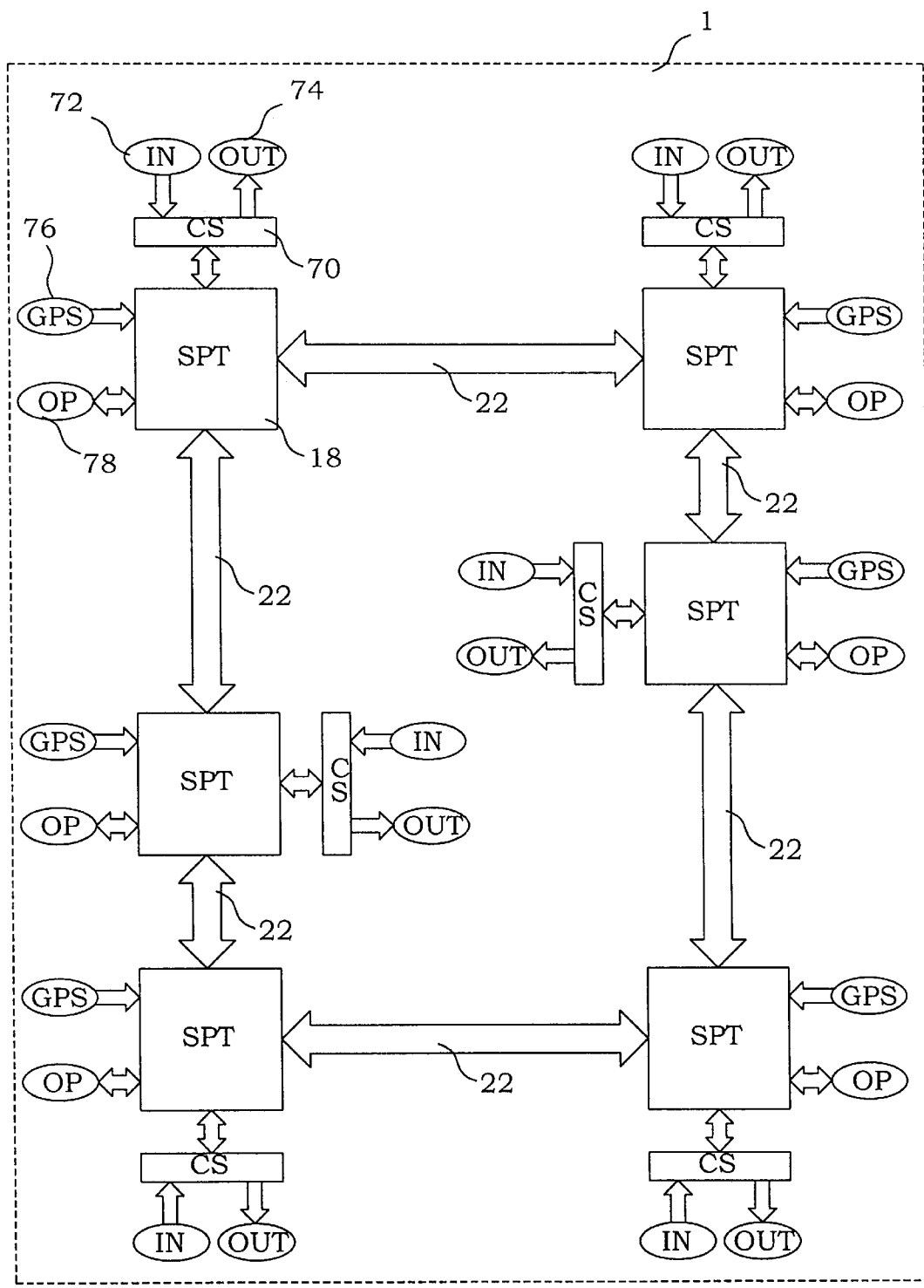
FIG. 7 is an embodiment of a system protection scheme comprising substantially identical standardized system protection terminals.

In one embodiment of the present invention, the system protection terminals are provided as more or less identical protection units, which can be connected by a communication network to operate anywhere in a power network as parts of a system protection scheme composed of system protection terminals. One such embodiment is illustrated in FIG. 7. The system protection terminals 18 are here illustrated as exchangeable units comprising identical means and are only distinguished in the configuration of the software of each terminal. In FIG. 7, an electric power system 1 comprises six system protection terminals 18, which are interconnected by a communication network 22. Each system protection terminal 18 is connected to a control system 70 for input 72 of measured power system characteristics and for output 74 of control information to power network objects. The system protection terminals 18 of this embodiment are further equipped with a GPS interface 76 and an operator interface 78. The illustration of the communication network 22 in FIG. 7 should be regarded as a general representation of a communication network of any configuration. As mentioned above, the network may in practice be formed e.g. as a loop or a meshed structure.

Figure 8:
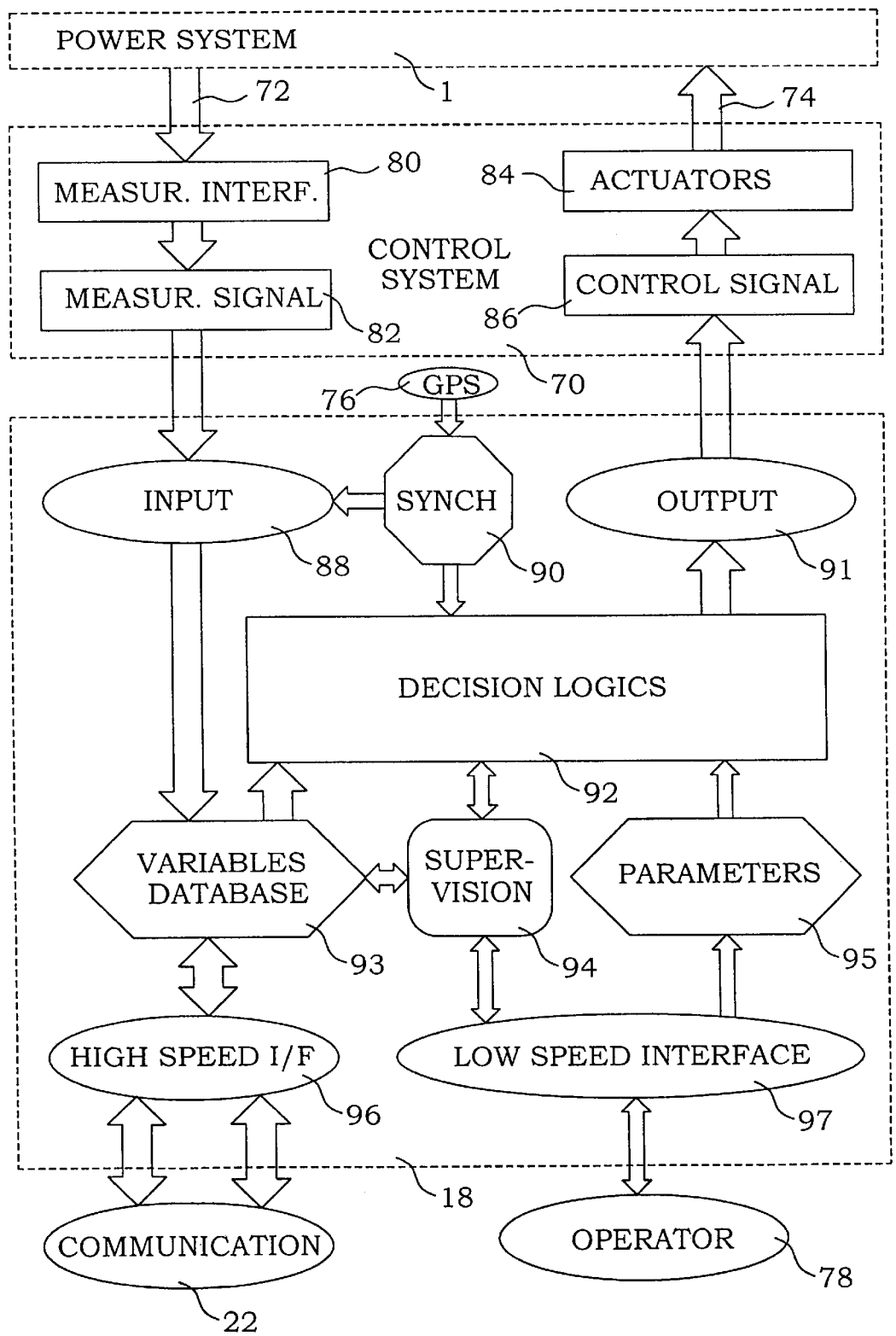
FIG. 8 is a detailed block scheme of a system protection terminal used in the embodiment of FIG. 7.

A more detailed illustration of a system protection terminal 18 according to the embodiment of FIG. 7 is shown in FIG. 8. Inputs 72 of measured power system quantities are received in the substation control system 70 by means of power system transducers and measurement devices 80. The measurement signals are transferred into internal measurement signals in a measurement signal unit 82. These local signals are communicated to an input interface 88 of the system protection terminal 18. A GPS time synchronization unit 90 uses GPS signals 76 to create a time reference for the measured data. This time reference is connected to the input interface 88 to create a time stamp for the received measurements. The time stamped measurements are further provided to a power system variable database 93. The power system variable database 93 is in turn connected bi-directionally to a high speed communication interface 96, which handles the communication on the communication network 22 to other system protection terminals 18.

The data in the power system variable database 93 will in this way contain information, not only about the power network variables of units connected directly to the system protection terminal 18 in question, but through the communication network 22 also about power network variables associated with other system protection terminals. The power system variable database 93 may therefore have, for its own purposes, a complete set of updated power system information. This information is available for a decision making logic unit 92, which is also supplied with an appropriate time reference from the GPS time synchronization unit 90. The decision making logic unit 92 is the heart of the local part of the system protection scheme. The decision making logic unit 92 comprises evaluation means for 2 5 detecting of power oscillations based on the available data and decides if any emergency damping actions have to be performed. If such actions are necessary, the decision making logic unit 92 uses an output interface 91 to send internal control signals, which even may comprise data concerning phase, frequency and amplitude of the intended damping action, to a control signal unit 86 in the control system 70. A power system actuator unit 84 transfers the internal control signals into relevant control signals 74 acting on the associated objects in the electric power system 1, performing the actual damping according to the instructions from the SPS.

A supervision unit 94 for supervision, service, maintenance and updates communicates with the power system variables database 93 and the decision making logic unit 92. This supervision unit 94 monitors and evaluates the operation of the system protection terminal 18 based on the information which was available in the power system variables database 93. Preferably, the supervision unit 94 comprises or is connected to a database of historic power system state information. Such a database may be used during autonomous operating conditions, for post-analysis of stressed situations or as a temporary source of locally available control information if communication links between system protection terminals are broken. An example of an autonomous operating condition could be if the links in the common communication network 22 connecting the three SPS arrangements 27 in FIG. 5 have broken down, and the system protection terminals in each of the three SPS arrangement 27 only can communicate among themselves.

The supervision unit 94 is bi-directionally connected to a low speed communication interface 97, for enabling communication with an operator via an operator interface 78. The operator is thereby allowed to monitor and influence the operation of the system protection terminal 18. Such an interaction is intended to be used in a precautionary manner and is normally not used for the emergency situations as such. The low speed communication interface 97 is also connected to a parameter setting database 95, which in turn is readable by the decision making logic unit 92. The parameter setting database 95 comprises parameters used by the decision making logic unit 92 in its operation. The operator thus has a possibility to manually tune the decision logics during operation, i.e. without taking the SPS out of service.

In some cases, the system protection terminal 18 may be necessary for emergency control of some power system objects, but no corresponding measurements are required. A SVC, situated in the middle of the power lines between two load/generator areas, may be such a case. The measurements of any power oscillations are performed at each side of the power line.

However, the damping control will be performed by the SVC, and therefore a system protection terminal 18 is suitably situated at the SVC. The system protection terminal 18 may in such position lack the units for measurement input, i.e. units 80, 82 and 88. The entire information on which the decision is based is in such cases received by the communication network 22 from the other system protection terminals 18. The emergency control action decision is, however, preferably made locally.

In other cases, no emergency control actions at all are relevant for the power system objects associated with the system protection terminal 18. In such cases, the system protection terminal 18 acts as an administrative system for measurement input, and decision logics and associated units may be omitted.

In a system comprising all of the variants above, some terminals only contains measurement related equipment, some terminals only contains emergency control related equipment, and some terminals contain both. In a general view, the system protection scheme comprises a set of system protection terminals. A first subset of terminals comprises means for measurement handling. This first subset may contain all terminals in the set or less. The first subset should, however, comprise at least two terminals, since the overall system concept otherwise would make no sense. A second subset of terminals comprises means for emergency power oscillation damping control. This second subset may contain all terminals in the entire set or less. It may also be identical to the first subset, if all terminals comprise both functions, or have a number of common terminals.

In some cases, oscillation damping control actions are rather straightforward and the probability of such actions very unlikely. One and the same terminal may in such a case effect the operation of such emergency control, by providing a connection between the output interface 91 and the high-speed communication interface 96. In a first terminal, the decision making logic unit 92 affects not only the decisions concerned with its own associated power system object, but also with power system objects associated with a neighboring terminal. If a control action on such neighbor object is determined, the internal control signal is provided to the high-speed communication interface 96 for further delivery to the neighboring terminal. In the neighboring terminal, which basically lacks the decision logics, the control signal is received in the high-speed communication interface 96 and is forwarded directly to the output interface 91. Such solutions are, however, not suitable when the time aspects are critical, since it involves additional communication steps.

Figure 9:
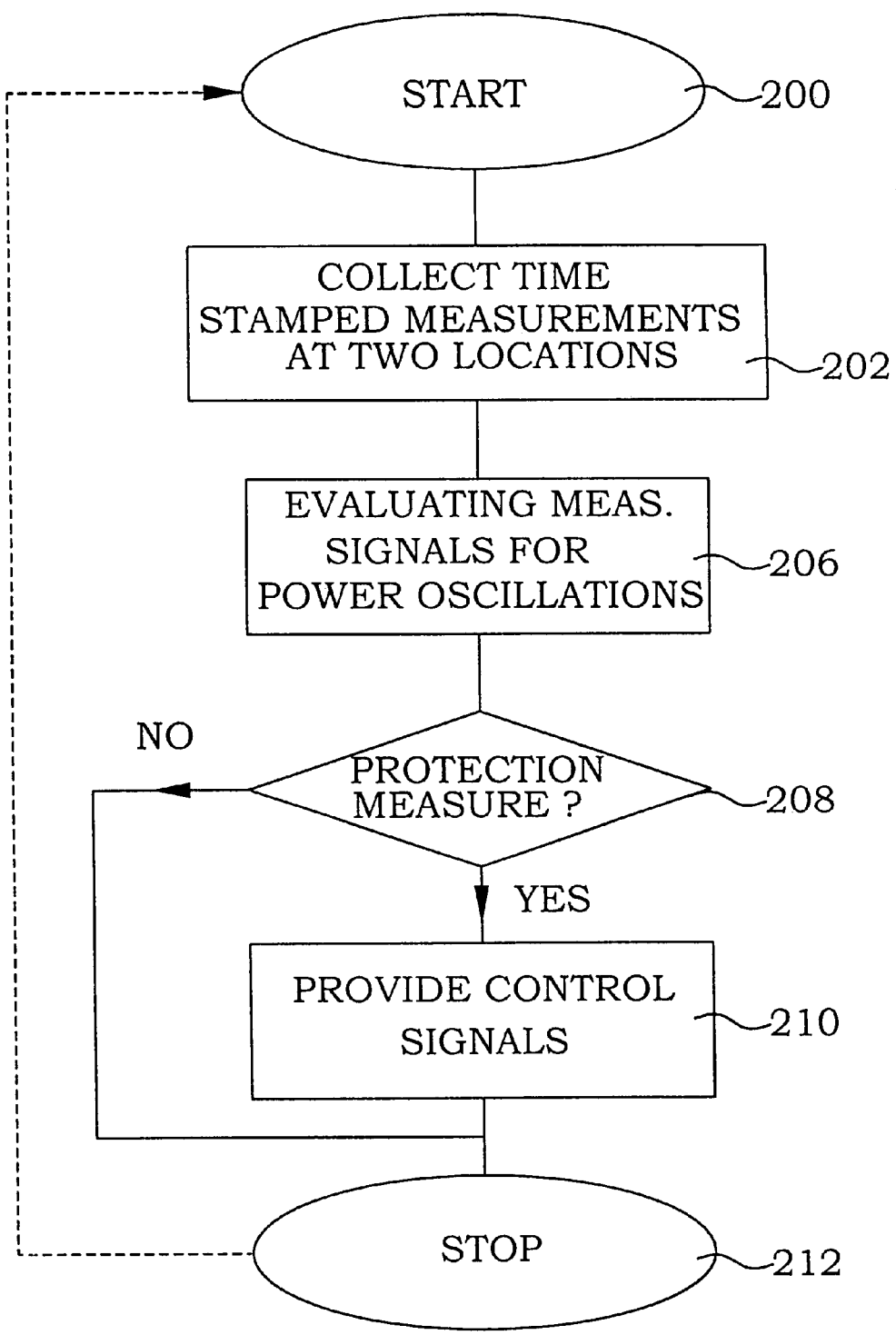
FIG. 9 is a flow diagram of a system protection method according to the present invention.

FIG. 9 shows a flow diagram of a general method for system protection according to the present invention. The process starts in step 200. In step 202, measurement signals corresponding to time-stamped measurements of voltage or current or quantities derivable therefrom are collected in at least two locations. Data associated with the measurements are communicated to terminals comprised in a second subset of terminals. The communication takes preferably place via a substantially dedicated communication resource. In step 206, available data is processed for evaluating any existence of poorly damped power oscillations in the power system. In step 208, it is determined if any need for emergency oscillation damping measures is present. If no emergency protection measures are necessary, the process continues to step 212. If damping measures are necessary, the process continues to step 210, where control signals for actuating such protection measures are provided. The process ends in step 212. This method is in principle a continuous never-ending method, and the steps will start all over again, when the method has reached its end. The steps will thus be comprised in a constantly recurrent loop. This is indicated by the broken line in the figure.

The method according to the present invention may be implemented as software, hardware, or a combination thereof. A computer program product implementing the method or a part thereof comprises a software or a computer program run on a general purpose or specially adapted computer, processor or microprocessor. The software includes computer program code elements or software code portions that make the computer perform the method using at least one of the steps previously described in FIG. 9. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, on a data server or via a network such as Internet.

The measurements of the present invention concern in particular phasor quantities, i.e. magnitude and angle of voltages and/or currents. Such measurements are fundamental to the present invention. These phasor quantities may easily be determined from time stamped voltage and/or current measurements. The required measurements of the present invention should therefore be referred to time stamped measurements of voltage or quantities derived from such measurements.

Based on these time stamped quantities a large number of related quantities can be derived, such as frequency, derivatives of the quantities, active and reactive power. Also sums, differences, maximum and minimum values are easily derivable. Also relation quantities such as thresholds, "larger than", "smaller than", etc., can be computed and used.

Although the time stamped measurements are of principal importance, other quantities, such as active power on lines or generators, valve opening and exciter outputs are valuable as additional information for the SPS system.

The measurements can be derived from many different transducers in the power system. Non-limiting examples are voltage transformers, current transformers, binary signals from relays, active and reactive power transducers, generator speed transducers, temperature transducers, etc. More specific transducers, such as phasor measurement units (PMUs), can also be used.

A phasor measurement unit (PMU) provides continuous or sampled phasor measurements in real time. Synchronized phasor measurements are e.g. described in "Synchronized Phasor Measurements in Power Systems" by A. G. Phadke in IEEE Computer Applications in Power, Vol. 6, No 2, April 1993, pp. 10–15. Such equipment is commercially available from several different suppliers, e.g. PMU model 1690 from Macrodyne, Inc. This PMU unit has an effective sample rate of more than 2 kHz and is time synchronized using GSP time to an accuracy of 1 $\mu$s.

Power system small-signal (oscillatory) stability can be improved in several different ways, common methods could be divided into control of generator excitation, generator input power, converters (power electronics), active power loads (load switching) and power system operating conditions.

For any particular problem, any one or more of these methods can be employed. The conventional approach to achieve the objective of controlling a set of poorly damped oscillatory modes is through stabilization via the excitation control of generators. Power System Stabilizers (PSS) on generators have traditionally provided a cost-effective method of enhancing small-signal stability of electric power systems by providing additional damping torque. The additional damping torque is in principal achieved by modulating the generator excitation to develop a component of the electric torque in phase with rotor speed variations. This braking torque via excitation control can be achieved by modulation of the electrical power or the mechanical power.

Damping of power system oscillations can as described above be achieved in several different ways. Several conventional controllable objects may be used to perform required emergency control actions according to the decisions made by the evaluation in the system protection terminals. The aim is to add damping to the generator oscillations by sending suitable control signals to power system devices. Suitable, but non-limiting examples of control signals are described briefly below. One may provide an additional signal to the Automatic Voltage regulator (AVR), which controls the exciter—either in parallel with a conventional PSS or as an alternative to a conventional PSS. One may also provide an additional signal to the governor control. Control signals may also be sent to dedicated braking resistors or to load objects that can be used for damping purposes. Another possible measure is to introduce changes in operating conditions for a power system, e.g. reduction of power output in areas with a surplus of generation. Control signals may also be provided to SVC, HVDC-converter, FACTS device and other high voltage equipment, which by receiving additional control signals can assist in providing additional damping to power system oscillations. More details on (conventional) damping of power system oscillations, in particular with use of Power System Stabilizers (PSS), can e.g. be found in P. Kundur "Power System Stability and Control", The EPRI Power System Engineering Series, McGraw-Hill, Inc., 1994, pp. 766–770, 1127–1131.

The communication system is an important part of the present invention. Since the system protection scheme operates in the emergency state of operation of a power system, the time is an important factor. Data has to be communicated between the different system protection terminals in such a fast manner that emergency actions still may have the intended effect. Using ordinary communication systems, e.g. SCADA (System Control And Data Acquisition) systems with shared communication resources gives an unacceptable uncertainty of the communication speed. The transfer times of information and control signals in a SCADA system are dependent on the loading of the SCADA system. The SCADA system is, unfortunately, typically particularly heavily loaded at stressed situations. A severe disadvantage of using such communication systems is thus that the response times turn out to be undetermined and too long.

The communication system of the present invention thus preferably requires a substantially dedicated communication resource for the communication between the system protection terminals. Such dedication ensures that the transmission times within the communication network can be estimated and all data can be available at all terminals within a predetermined time. The value of this time depends on the transmission capacity of the communication resource, the amount of data to be communicated and the communication network configuration. In order to be able to establish damping of system wide power oscillations, the requirements on the predetermined maximum communication time is in the order of fractions of a second. The capacity of the communication resource has to be adapted thereafter, stressing the importance of fixed (or at least predictable) delays in the communications system.

The term "communication resource" is in this document referring to any limited, allocable communication resource. Examples could be time slots or frequency bands in radio transmitted communication systems, or separate physical links, such as dedicated fibers or wires. The important feature is that the capacity of the resource is permanently allocated to the system protection scheme communication and not influenced by competing traffic.

The actual implementation of the communication system can according to conventional technology be performed in many different ways. Fiber networks, microwave links or for shorter distances even copper wires are possible solutions, either separately or in combination. Communication using publicly available networks, such as Internet, would also be possible, if the transmission requirements can be ensured. Communication based on power line carriers may be a well-suited alternative. However, the probability for interruptions in communication increases in connection with instability in the network.

It will be understood by those skilled in the art that various modifications and changes may be made to the present invention without departure from the scope thereof, which is defined by the appended claims.

What is claimed is:

1. System protection scheme (SPS) for protection of the integrity of an overall electric power system against poorly damped power oscillations, comprising:
   a set of at least two system protection terminals, and
   a communication system interconnecting said at least two system protection terminals,
   said at least two system protection terminals in turn comprising:
      a processor unit, and
      a communication unit connected to said processor unit for communication on said communication system,
   wherein system protection terminals in a first subset of said set of system protection terminals comprise measurement signal obtaining means connected to said processor unit for collecting measurement signals of measured characteristics of said electric power system, said first subset comprising at least two system protection terminals, said measured characteristics comprising at least one of, time stamped voltage values, time stamped current values, and quantities derivable therefrom,
   wherein said processor unit in system protection terminals in a second subset of said set of at least two system protection terminals in turn comprises evaluation means for detecting poorly damped power oscillations based on said measured characteristics from at least two of said system protection terminals in said first subset,
   wherein said evaluation means being arranged for obtaining node angle differences between different locations associated with said system protection terminals of said first subset and for determining at least one of amplitude, frequency and damping of said detected power oscillations from said node angle differences, and
   wherein said system protection terminals in said second subset further comprising control signal providing means connected to said processor unit for providing control signals to power system actuating units counteracting said poorly damped power oscillations in response to an output of said evaluation means.

2. Scheme according to claim 1, wherein said evaluation means is arranged for obtaining data concerning rotor angle differences between said different locations in said electric power system.

3. Scheme according to claim 1, wherein said evaluation means is arranged for determining a mode of oscillation of said detected power oscillation.

4. Scheme according to claim 1, wherein said control signal providing means is adaptive in response to output data from said evaluation means.

5. Scheme according to claim 1, wherein said evaluation means is arranged for detecting poorly damped power oscillations of a frequency between 0.05 and 4 Hz.

6. Scheme according to claim 1, wherein said communication unit is arranged for communication of data associated with said measurement signals over a substantially dedicated communication resource in said communication system.

7. Scheme according to claim 1, wherein said system protection terminals of said second subset also comprise storage means for storing/retrieving data.

8. Scheme according to claim 1, wherein said communication system is dimensioned to transmit data between any two system protection terminals in said set within a predetermined time.

9. Scheme according to claim 8, wherein said predetermined time is less than 1 s.

10. Scheme according to claim 1, wherein one or more of said system protection terminals may be active in more than one parallel decision process.

11. Electric power system, comprising:
    a number of nodes,
    power lines interconnecting said nodes,
    at least one power generator connected to one of said nodes,
    at least one power load connected to one of said nodes, and
    an SPS (System Protection Scheme) for protection of the integrity of said electric power system against poorly damped power oscillations,
    said SPS in turn comprising:
       a set of at least two system protection terminals, and
       a communication system interconnecting said at least two system protection terminals,
    said at least two system protection terminals in turn comprising:
       a processor unit, and
       a communication unit connected to said processor unit for communication on said communication system,
    wherein system protection terminals in a first subset of said set of system protection terminals comprise measurement signal obtaining means connected to said processor unit for collecting measurement signals of measured characteristics of said electric power system, said first subset comprising at least two system protection terminals, said measured characteristics comprising at least one of, time stamped voltage values, time stamped current values, and quantities derivable therefrom,
    wherein said processor unit in system protection terminals in a second subset of said set of at least two system protection terminals in turn comprises evaluation means for detecting poorly damped power oscillations based on said measured characteristics from at least two of said system protection terminals in said first subset,
    wherein said evaluation means being arranged for obtaining node angle differences between different locations associated with said system protection terminals of said first subset and for determining at least one of amplitude, frequency and damping of said detected power oscillations from said node angle differences, and
    wherein said system protection terminals in said second subset further comprising control signal providing means connected to said processor unit for providing control signals to power system actuating units counteracting said poorly damped power oscillations in response to an output of said evaluation means.

12. System according to claim 11, wherein said evaluation means is arranged for obtaining data concerning rotor angle differences between said different locations in said electric power system.

13. System according to claim 11, wherein said evaluation means is arranged for determining a mode of oscillation of said detected power oscillation.

14. System according to claim 11, wherein said control signal providing means is adaptive in response to output data from said evaluation means.

15. System according to claim 11, wherein said evaluation means is arranged for detecting poorly damped power oscillations of a frequency between 0.05 and 4 Hz.

16. System according to claim 11, wherein said communication unit is arranged for communication of data associated with said measurement signals over a substantially dedicated communication resource in said communication system.

17. System according to claim 11, wherein said system protection terminals of said second subset also comprise storage means for storing/retrieving data.

18. System according to claim 11, wherein said communication system is dimensioned to transmit data between any two system protection terminals in said set within a predetermined time.

19. System according to claim 18, wherein said predetermined time is less than 1 s.

20. System according to claim 11, wherein one or more of said system protection terminals may be active in more than one parallel decision process.

21. System protection method for the protection of the integrity of an overall electric power system against poorly damped power oscillations, comprising the steps of:
    collecting measurement signals associated with measured characteristics of said electric power system in at least two locations of said electric power system, said measured characteristics comprising at least one of, time stamped voltage values, time stamped current values, and quantities derivable therefrom,
    evaluating said measurement signals, for detecting poorly damped power oscillations based on said measured characteristics,
    said evaluating step in turn comprising the steps of obtaining node angle differences between said at least two locations and determining at least one of amplitude, frequency and damping of said poorly damped power oscillations from said node angle differences, and
    providing control signals to actuating units in said electric power system, if system protection measures are necessary according to said evaluating step.

22. System protection method according to claims 21, wherein said evaluating step also comprises the step of obtaining data concerning rotor angle differences between said at least two locations in said electric power system.

23. System protection method according to claim 21, wherein said evaluating step further comprises the step of determining a mode of oscillation of said detected power oscillation.

24. System protection method according to claim 21, wherein said step of providing control signals is adaptive in response to the result from said evaluating step.

25. System protection method according to claim 21, wherein said evaluating step in turn comprises the step of detecting poorly damped power oscillations of a frequency between 0.05 and 4 Hz.

26. System protection method according to claim 21, comprising the further step of communicating data over a substantially dedicated communication resource.

27. System protection method according to claim 21, comprising the further step of storing said data comprising measurement data or data derived therefrom.

28. System protection method according to claim 21, wherein said processing step in turn comprises the step of retrieving said stored data.

29. System protection method according to claim 21, wherein said communication step is performed within a predetermined time.

30. System protection method according to claim 29, wherein said predetermined time is less than 1 s.

31. System protection terminal for protection of the integrity of an overall electric power system against poorly damped power oscillations, comprising:
    a processor unit,
    a communication unit connected to said processor unit,
    measurement signal obtaining means connected to said processor unit for collecting measurement signals of measured characteristics of said electric power system, said measured characteristics comprising at least one of, time stamped voltage values, time stamped current values, and quantities derivable therefrom,
    said processor unit in turn comprising evaluation means for detecting poorly damped power oscillations based on said measured characteristics and corresponding characteristics for different nodes in said electric power system received by said communication unit,
    said evaluation means being arranged for obtaining node angle differences between said different nodes and for determining at least one of amplitude, frequency and damping of said detected power oscillations from said node angle differences, and
    control signal providing means connected to said processor unit for providing control signals to power system actuating units.

32. System protection terminal according to claim 31, wherein said evaluation means is arranged for obtaining data concerning rotor angle differences between said different nodes in said electric power system.

33. System protection terminal according to claim 31, wherein said evaluation means is arranged for determining a mode of oscillation of said detected power oscillation.

34. System protection terminal according to claim 31, wherein said control signal providing means is adaptive in response to output data from said evaluation means.

35. System protection terminal according to claim 31, wherein said evaluation means is arranged for detecting poorly damped power oscillations of a frequency between 0.05 and 4 Hz.

36. System protection- terminal according to claim 31, wherein said processing unit further comprises decision processing means for power system control.

37. System protection terminal according to claim 31, wherein said communication unit is arranged for communication of data associated with said measurement signals over a substantially dedicated communication resource.

38. System protection terminal according to claim 31, further comprising storage means for storing data.

39. A computer program product comprising at least one of computer code means and software code portions for making a processor perform the steps of:
    collecting measurement signals associated with measured characteristics of said electric power system in at least two locations of said electric power system, said measured characteristics comprising at least one of, time stamped voltage values, time stamped current values, and quantities derivable therefrom,
    evaluating said measurement signals, for detecting poorly damped power oscillations based on said measured characteristics, said evaluating step in turn comprising the steps of obtaining node angle differences between said at least two locations and determining at least one of amplitude, frequency and damping of said poorly damped power oscillations from said node angle differences, and providing control signals to actuating units in said electric power system, if system protection measures are necessary according to said evaluating step.

40. A computer program product according to claim 39, supplied via a network.

41. A computer readable medium containing program product comprising at least one of computer code means and software code portions for making a processor perform the steps of:

collecting measurement signals associated with measured characteristics of said electric power system in at least two locations of said electric power system, said measured characteristics comprising at least one of, time stamped voltage values, time stamped current values, and quantities derivable therefrom, evaluating said measurement signals, for detecting poorly damped power oscillations based on said measured characteristics, said evaluating step in turn comprising the steps of obtaining node angle differences between said at least two locations and determining at least one of amplitude, frequency and damping of said poorly damped power oscillations from said node angle differences, and providing control signals to actuating units in said electric power system, if system protection measures are necessary according to said evaluating step.

* * * * *

UNITED STATES PATENT AND TRADEMARK OFFICE
CERTIFICATE OF CORRECTION

PATENT NO. : 6,476,521 B1
DATED : November 5, 2002
INVENTOR(S) : Lof et al.

It is certified that error appears in the above-identified patent and that said Letters Patent is hereby corrected as shown below:

Column 28,
Line 1, change "claim 21" to -- claim 27. --
Line 47, change "protection-terminal" to -- protection terminal --.

Signed and Sealed this

Sixteenth Day of March, 2004

JON W. DUDAS
*Acting Director of the United States Patent and Trademark Office*